United States Patent Office 3,509,565
Patented Apr. 28, 1970

3,509,565
METHOD AND APPARATUS FOR OPTICALLY PROCESSING INFORMATION
Raymond M. Wilmotte, 64 Newlin Road, Princeton, N.J. 08540
Filed June 19, 1961, Ser. No. 118,041
Int. Cl. G01s 9/44
U.S. Cl. 343—9  13 Claims The present invention relates to the field of optical information processing, particularly by means of optical cross-correlation techniques. This invention is described herein with particular references to radar and the processing of radar information, to obtain an indication or measure of target range and velocity. However, the application of the invention to radar is only exemplary, in order to facilitate a complete understanding of the invention and its operation, and it is not to be construed as limited to this application.

A basic tool utilized in the particular specific embodiment of the present invention described herein, is a transparent, ultrasonic bi-refractive, solid delay line sandwiched between crossed light polarizers. The delay line is associated with a transducer for converting an electrical signal into a corresponding ultrasonic wave, as the intelligence or information input to the line; while a beam of light is applied through the polarizers and the delay line transversely thereof and is modified by the sonic energy of the intelligence input. The sonic energy of the input signal travels down the delay line, and the stresses introduced by this energy cause a rotation of the plane of light passing through the delay line, consequently affecting the light pattern emerging from the delay line-polarizer system. The rotation of the light at any particular instant for a given point along the delay line is a function of the ultrasonic signal or waveform present at that point. Thus, the intensity of light passed by the system at any selected point along the delay line varies in time in accordance with the input signal. Likewise, the emergent overall light intensity pattern for the entire length of the delay line corresponds to the ultrasonic waveform present along the line at any particular instant, and this overall emergent light pattern of course varies in time in accordance with a continuing information input signal to the line.

If two such delay line—polarizer systems are employed, and arranged so that a single beam of light passes through both systems, while a first signal is applied to one delay line transducer and a second signal is applied to the other delay line transducer, the light output of the combined system is the cross-correlation function of the two signals, and obtains a maximum time integrated light output for the system where the waveforms on the two delay lines are identical and in spatial registry along their respective lines. Thus, if a signal is transmitted for radar purposes having a waveform $f_T(t)$ (which may be a pulse or other waveform such as a random noise signal), in a time period thereafter the echo signal is received from a target and it has a waveform $f_R(t)$. The received signal may be identical to the transmitted signal, or it may vary therefrom by a Doppler frequency if there is relative motion between the radar station and the target. In accordance with the present invention, the transmitted signal is applied to one delay line transducer, while the received signal is applied to the other delay line transducer. The two transducers are located at opposite ends of their respective delay lines, so that the received and transmitted signals travel in opposite directions on the delay lines. The maximum integrated light intensity pattern emergent from the system appears at the point along the delay lines where the oppositely traveling waveforms $f_T(t)$ and $f_R(t)$ obtain identity, or are most nearly identical. Since the point along the delay lines where this identity occurs is a function of the time delay between application of the two signals to their respective delay lines, this point is a measure of the range of the target. The light emergent from the foregoing system is the correlation function of the two signals $f_T(t)$ and $f_R(t)$.

There is a slight difference in the frequencies of these two signals if there is relative movement between the target and radar station. This Doppler frequency is embodied in the fine structure of the emergent light, as a continuous phase shifting of the output waveform at that Doppler frequency. The light beam utilized in the present system is intensity modulated to provide simultaneously a band of frequencies embracing the expected range of Doppler frequencies. This band of frequencies is distributed along a dimension transverse to the line of travel of signals in the delay lines. That one of the intensity modulations which equals the Doppler frequency will then function in a manner akin to a stroboscope rendering the light output pattern obtained from that segment of the light beam fixed or unchanging. Therefore, the location of this condition is a measure of target velocity, since it occurs at a position along a dimension transverse to that for the range measurement, and at a point depending upon that Doppler frequency which is present.

It is accordingly one object of the present invention to provide for the cross-correlation of two signals having substantially similar waveforms.

Another object of the present invention is to provide for the determination of two parameters by optical cross-correlation techniques.

Another object of the present invention is to provide for the cross-correlation of two signals having substantially similar waveforms which are time displaced, and for ascertaining said time displacement.

Another object of the present invention is to provide for the cross-correlation of two signals having substantially similar waveforms, but differing slightly in frequency and which are time displaced, and for ascertaining said time displacement and frequency difference.

Still another object of the present invention is to provide for the processing of radar information by optical cross-correlation techniques, to determine simultaneously the range and velocity of a target.

Other objects and advantages of the present invention will become apparent to those skilled in the art from a consideration of the following detailed description of one exemplary embodiment thereof, had in conjunction with the accompanying drawings, in which like numerals refer to like or corresponding parts, and wherein:

FIG. 1. is a schematic showing of one embodiment of an optical cross-correlation system embodying the present invention;

FIG. 4 is a schematic showing of a light intensity modulating system which may be employed to provide the light beam input for the system of FIG. 1.

Figure 1:
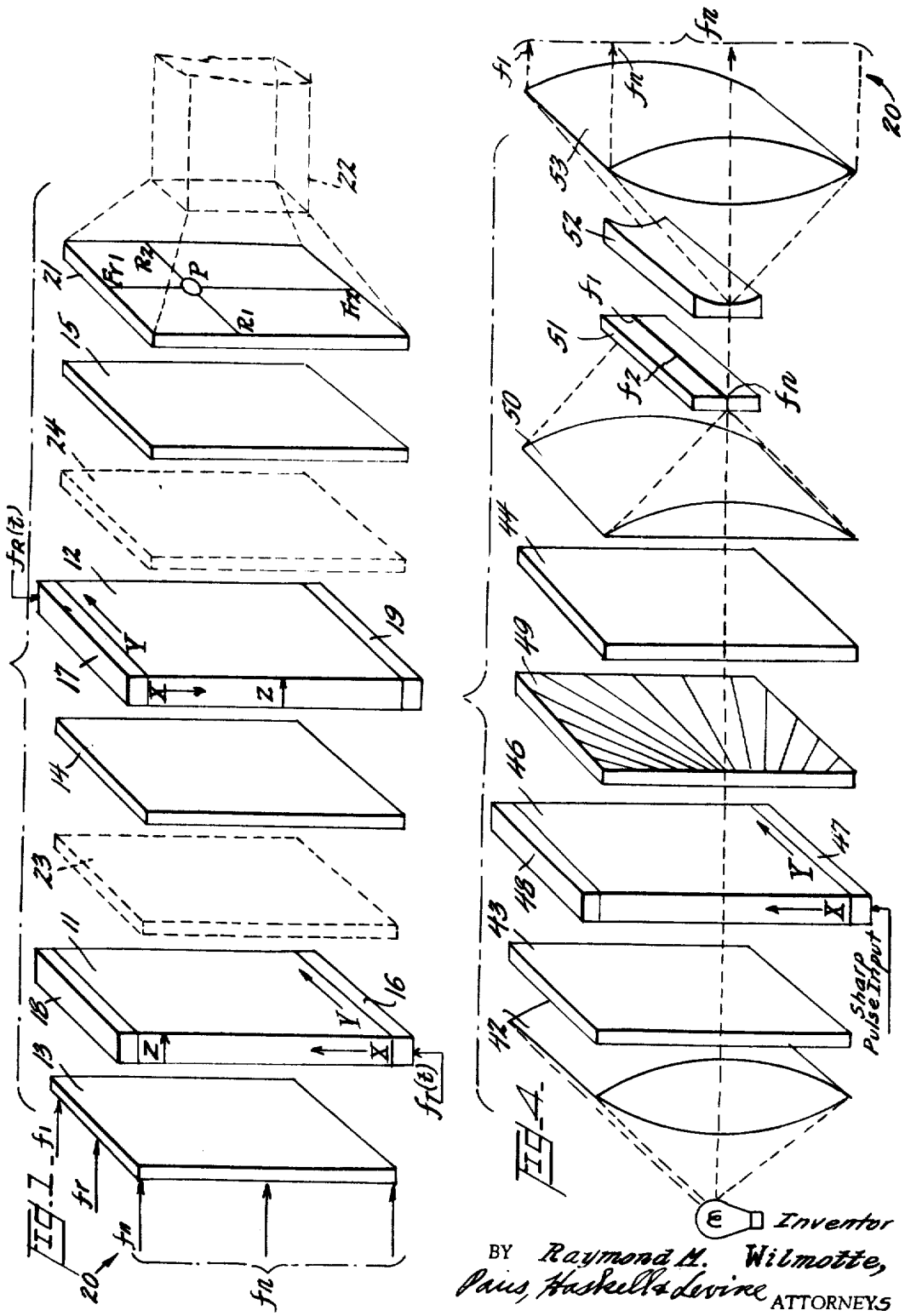

With particular reference to the exemplary specific embodiment of the present invention shown in FIG. 1, the signal processing system thereof comprises two transparent, solid, ultra-sonic, bi-refractive delay line panels 11 and 12, sandwiched between crossed light polarizer films 13, 14 and 15. The delay line panels are preferably formed of fused quartz, and have substantial length and width dimensions, X and Y. The input end or edge of each delay line has coupled thereto an electrical-sonic transducer, 16 for line 11, and 17 for line 12.

These transducers are preferably piezoelectric devices having suitable electrodes for application of an electric signal. The end or edge of each delay line remote from the input transducer is provided with a sonic energy absorber, 18 for line 11, and 19 for line 12, for absorbing the sonic energy traveling down the line, and preventing or minimizing reflections of sonic energy which would interfere with subsequent input signal waveforms on the delay line.

Delay line 11 is sandwiched between polarizers 13 and 14, which are crossed, or whose axes are displaced 90° relative to each other. Also, it is preferred that these polarizers be oriented at 45° relative to the line of travel X of sonic energy down the delay line 11 when compressional waves are being employed. In the case of shear waves, it is preferred that the orientatioin be parallel and perpendicular to the direction of travel of the energy. These respective relationships provide maximum sensitivity for the system. Delay line 12 is sandwiched between crossed polarizers 14 and 15, which occupy the same relationship to line 12 and to each other as do polarizers 13 and 14 to line 11 and to each other. Wherefore, it follows that polarizer 15 is oriented the same as polarizer 13.

The system is energized by or operates on a parallel beam of light 20, which passes through the polarizer film 13, the thickness dimension Z of delay line 11 transverse to the line of travel X of sonic energy therein, through polarizer 14, and then similarly through delay line 12 and polarizer 15, to emerge upon a light integrating screen 21, which may be the photo-conductor plate of a television type camera tube 22, for example. The light pattern emergent from line 11 may, of course, desirably be optically focused on line 12, and similarly with respect to the transmission of light from line 12 to screen 21, by lens systems not shown. In passing through polarizer 13, light beam 20 is polarized in one plane. The polarized light then passes through delay line 11 to polarizer 14. If there is no sonic signal in line 11, essentially no light is passed by second polarizer 14. However, the presence of a sonic signal on line 11 creates corresponding stresses in the quartz in accordance with the line structure of the waveform of that signal, as it is distributed and travels along the delay line in the direction X. These stresses produce a bi-refractive effect on the light transmitted through the delay line, and therefore, the intensity of light emerging from second polarizer 14 varies sinusoidally with the stress, or the amplitude of the waveform present on the delay line. Thus, if a continuous electrical signal $f_T(t)$ is applied to transducer 16, at any instant the light emergent from polarizer 14 obtains an intenity pattern along the dimension X which corresponds to the amplitude pattern or function contained in the input signal $f_T(t)$ for that segment or portion of the signal distributed along the delay line at that particular instant. This emergent light intensity pattern varies with time, of course, as the signal $t_T(t)$ is continued to be applied and as the signal travels down the line to the absorber 18. The other delay line 12 functions in the same manner in cooperation with polarizers 14 and 15, in response to the light beam pattern emergent from polarizer 14, and operates upon that light beam with an electrical input signal $f_R(t)$. The ultimate light intensity pattern emergent from polarizer 15 embodies the cross-correlation function of the two signals $f_T(t)$ and $f_R(t)$. Since the correlation function output is expressed in terms of light intensity, the emergent light pattern is integrated on a photoconductor screen 21, and may be conveniently read out electrically by electronic scanning of the screen 21.

Figure 2:
FIG. 2 is an illustrative graphic plot of light intensity versus stress as passed by delay line and crossed polarizers systems utilized in the embodiment of the present invention shown in FIG. 1.

The light intensity emergent from either delay line-crossed polarizer set of FIG. 1 for any given point along the dimension X, varies correspondingly with the amount of stress present at that poinnt in the delay line according to a sinusoidal law as shown in FIG. 2. In the preferred embodiment of the invention, a quarter-wave optical plate is inserted between each pair of crossed polarizers, at any convenient point. Thus one quarter-wave optical plate 23 is inserted between polarizers 13 and 14, and another quarter-wave optical plate 24 is inserted between polarizers 14 and 15. The purpose of the quarter-wave optical plates is to shift the origin of the stress-optical characteristic to a desired point on the curve of FIG. 2. When the axis of the quarter-wave plate is parallel or perpendicular to the length or X dimension of the respective associated delay line for compressional waves, or 45° to said X dimension for shear waves, the orgin of the stress-optical characteristic is located at $O_1$. This origin may be shifted to any point between O and $O_1$, such as $O_2$, by changing the orientation of the quarter-wave plate. The system is preferably set to have its origin at $O_1$ in order to operate over the most linear portion of the stress-optical characteristic curve.

For the purpose of illustrating the operation of the system as thus far described, it will be assumed that the light beam 20 is a parallel beam of uniform light, and not modulated in any manner. It is further assumed that the system is being utilized to process radar information. To this end, the input signal applied to transducer 16 is designated as $f_T(t)$, this being the transmitted radar signal applied to transducer 16 substantially coincident with transmission thereof; while the input signal applied to transducer 17 is designated as $f_R(t)$, this being the received radar echo signal applied to transducer 17 substantially coincident with reception thereof. These signals may be pulses, or continuous signals having an appropriate repetitive or a random pattern. Each signal applied to the respective transducer is injected into the corresponding delay line along its entire width dimension Y, and travels in a finite time as sonic energy along its length dimension X to the end of the delay line, where it is absorbed.

Thus, it is apparent that there is a time delay between the application of a given increment of signal $f_T(t)$ to delay line 11, and the application of that increment after reflection by the target to delay line 12, as signal $f_R(t)$. Assuming that the time of travel of a signal along the delay line is greater than the radio transmission-reflection time corresponding to the range of a target, a given increment of reflected signal $f_R(t)$ traveling down delay line 12 will pass in spatial coincidence with the corresponding increment of transmitted signal $f_T(t)$ at some point along the X dimension of the delay lines. Since the location of this point varies with the time lapse between transmission and reception of the given signal increment, the location of this point becomes a measure of the range of the target.

The cross-correlation of signals $f_T(t)$ and $f_R(t)$ is a maximum at said point of spatial coincidence of these two signals, providing a maximum complementing of light modulation to accord with the double crossed polarizers 13, 14 and 15, and a maximum quantity of light output over a period of time. The light output pattern emergent from polarizer film 15 is integrated on photoconductor screen 21. For a particular target range, the maximum output value will occur along a particular line on the Y dimension, as represented by line $R_1R_2$ on screen 21, and this value or reading may be detected by electronic scanning of the screen, such as with a television camera tube, or alternatively incorporating the photoconductor screen as one layer of a photoconductive electroluminescent light amplifier panel.

In addition to range, it is usually desired to determine the velocity of the target relative to the radar station. Such velocity of the target is present in the radar signals in the form of a Doppler frequency imposed upon the transmitted signal frequency. In this instance then, the received signal $f_R(t)$ differs from the transmitted signal $f_T(t)$ by the Doppler frequency. This means that every point in the fine structure of the cross-correlation function will be changing in amplitude (or intensity) at the rate of the Doppler frequency. The amplitude changes take place with different phases at each point but the envelope of the correlation function remains unchanged.

Figure 3:
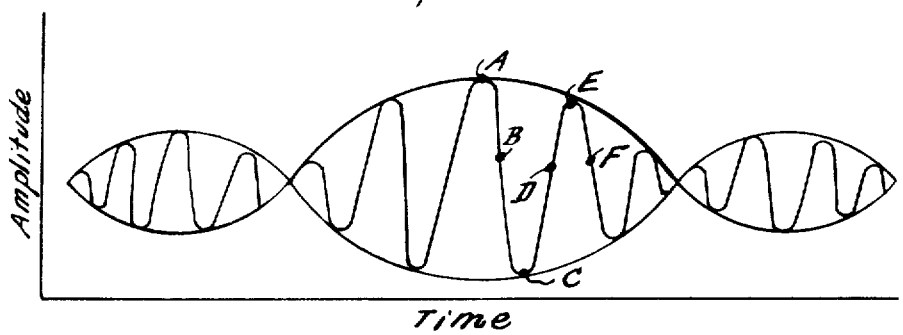
FIG. 3 is an illustrative graphic plot of a cross-correlation output obtained by the present invention, showing the envelope and fine structure thereof.

A typical correlation function is shown in FIG. 3. If any point on the waveform, such as A, B, C, D, E or F is examined with a photocell independently of the rest of the correlation function, the output will be a simple sine wave having a frequency equal to a Doppler frequency. While the point A is moving down from its presently shown maximum position, the point B is moving up from its mid-position and point C is also moving up from its minimum position; point D is moving up, and E and F are moving down. The total effect of this phase change, which represents a total of 360° from point A to point E, is to give the impression that the peak values, such as A and E, are moving laterally while the envelope remains fixed. This apparent motion is similar to the phenomenon of waves on water which appear to move laterally while in actual fact the water molecules move essentially vertically. The apparent motion is in one direction or the other depending on whether the Doppler frequency is positive or negative.

The correlation function along the line $R_1R_2$ in FIG. 1 is therefore experiencing the Doppler variation just described. If the photosensitive screen 21 integrated the signal for a period of time which is long compared with the Doppler period, the output along the line $R_1R_2$ would be zero and the correlation function would not be detectable. If, however, the light beam used is a specially modulated light beam having a band of frequencies ranging from $f_1$ to $f_n$ distributed along the Y dimension, and this frequency band covers the range of Doppler frequencies anticipated, then along a line $F_{r1}F_{r2}$ all targets which have a Doppler frequency corresponding to $f_r$ will be stabilized, because the modulation of the light beam at frequency $f_r$ will produce a stroboscopic effect rendering stationary the apparent motion of the fine structure of the correlation function described above. A target of range R and exhibiting a Doppler frequency $f_r$ will therefore appear as an integrated output on the photosensitive screen 21 only at the intersection of the two lines $R_1R_2$ and $F_{r1}F_{r2}$, designated P. The point P thus provides a reading of target range, and of target velocity as obtained from the Doppler frequency.

The specially modulated light beam described above, as indicated in the illustration of beam 20 in FIG. 1. Beam 20 embodies an intensity modulation which is different for each point along the Y dimension of the system, and spans a band of frequencies anticipated for Doppler frequencies. This band is represented in FIG. 1 as $f_1$ to $f_n$, $f_r$ being any intermediate frequency. As further indicated in FIG. 1, light beam 20, at any given point along the system's Y dimension, has a single intensity modulation frequency over the entire X dimension line for that Y dimension point.

One illustrative means for obtaining the desired modulation of light beam 20 is schematically illustrated in FIG. 4. The light modulator system of FIG. 4 employs some of the principles described above in connection with FIG. 1, and is in part described in detail in the patent application of Raymond M. Wilmotte, Ser. No. 835,648, filed Aug. 24, 1959, entitled Cross-Correlator, now abandoned. The system of FIG. 4 is described briefly hereinafter.

The system of FIG. 4 includes a bi-refractive ultrasonic, transparent delay line panel 46, having a piezoelectric input transducer 47 at one end and an absorber 48 at the opposite end. This delay line panel is thus similar to panels 11 and 12 of FIG. 1; and like panels 11 and 12, panel 46 is also sandwiched between crossed light polarizer films 43 and 44, all for the same purposes as the system of FIG. 1. Light emitted from a source 41 to is collimated by lens 42 and directed to pass through the polarizer 43, delay line 46, and polarizer 44. In view of the previous discussion, when no signal is applied to the delay line 46, essentially no light is emergent from polarizer 44. However, when a sharp electrical pulse is applied to transducer 47, a stress line is established across the delay line 46 along the Y dimension, and this stress line travels up the delay line along the X dimension as the sonic energy moves along the delay line to the absorber. Under these conditions, as thus far described, there would result as the light output emergent from polarizer 44, a light line extending across the polarizer in the Y dimension, and traveling upwardly in coincidence with the spatial location of the traveling stress line in the delay line 46. An optical mask 49 is interposed between the delay line 46 and polarizer 44, containing a pattern of transparent and opaque lines arranged as generally illustrated in FIG. 4. This pattern provides a frequency of transparent and opaque sections with respect to a vertical scan thereof along the X dimension which varies along the Y dimension, the frequency decreasing from left to right in the direction of the arrow associated with the Y designation. Accordingly, the light line emergent from polarizer 44 is interrupted by the opaque lines on mask 49 as the light line traverses the X dimension of system, and the frequency of interruption varies along the Y dimension in accordance with the frequency variation of the opaque and transparent portions of the mask.

This resultant light pattern emergent from mask 44 is condensed by lens 50 into a line on panel 51, where the traveling light line is converted into a stationary light line modulated along its length with different frequencies spanning the band $f_1$ to $f_n$. Panel 51 may conveniently be a photoconductor-electroluminescent light amplifier, to build up the intensity of the light line as desired. The light output of panel 51 is then expanded in the X dimension by means of lens 52, and collimated into beam 20 by lens 53. Parallel beam 20 depicted as the output of lens 53 in FIG. 4, is the input beam 20 in FIG. 1, having intensity modulation along its Y dimension spanning the band of frequencies $f_1$ to $f_n$.

It will thus be appreciated that in accordance with the present invention there is effected an optical cross-correlation of two signals which have similar waveforms but may differ somewhat from each other in frequency. The cross-correlation function optical output, when utilizing a specially modulated beam of light for the optical system, provides a measure or indication of the time lag between the two correlated signals, and of the difference in frequency therebetween. These features are particularly adapted to the processing of radar information, wherein the time lag between the correlated signals is the time between transmission of a signal and reception of the echo thereof, which is a measure of the target range; and the difference in frequency between the transmitted and received signals is the Doppler frequency caused by motion of the target relative to the radar system, and hence is an indication of target velocity relative to the radar system.

In its broader aspects, the present invention effects a simultaneous presentation or determination of two parameters of intelligence by optical cross-correlation techniques. One parameter is embodied in the point of maximum correlation between two signals, and the other parameter is embodied in the response of the signals to a selected modulation function of the light beam utilized in the optical cross-correlation. For the purpose of illustration, one intelligence or information parameter has been herein described as a target velocity, while the other parameter has been described as a target range. Obviously, other parameters can be expressed or converted into the two dimensions of the present system embodied in: (1) the time delay between the two signals being correlated, and (2) the modulation in the input light beam 20. It is further apparent that this modulation in beam 20 may be different than the particular type of modulation herein suggested for the particular purpose of ascertaining a Doppler frequency.

This invention has been illustrated in one specific embodiment in order to enable a complete understanding thereof. However, the invention is not limited to the described embodiment, for numerous modifications and variations will be apparent to those skilled in the art. Accordingly, those modifications and variations as are embraced by the spirit and scope of the appended claims, are contemplated as within the purview of the present invention.

For example, one may obtain the specially modulated light beam 20 by passing in front of a parallel beam of light a photographic film having opaque and transparent lines patterned in the manner of the mask 49. Similarly, the optical cross-correlation could be effected by photographic film. The signals $f_T(t)$ and $f_R(t)$ could be developed on films, and the two films run past each other in opposite directions, thereby producing an effect on a light beam passing through these films substantially similar to that obtained by the described delay lines—crossed polarizers system. The integrated optical output of such a system would contain the cross-correlation function of the two signals. Other means of light modulation may of course be employed. However, applicant considers the embodiment specifically described as preferred and most practical at the present state of development of the art.

What is claimed is:

1. A system for processing radar information to obtain an indication of the range and velocity of a target, comprising means for transforming the transmitted radar signal into a form capable of affecting a beam of light in accordance with the waveform of the transmitted signal, means for transforming the received radar echo signal into a form capable of affecting a beam of light in accordance with the waveform of the received signal, means for conducting said transformed signals past each other along a first line, means for directing a modulated beam of light serially through said last-mentioned means, the modulation of said beam of light being an intensity modulation pattern spanning a band of intensity modulation frequencies corresponding to expected Doppler frequencies in the echo signal, said pattern of frequencies providing a number of different frequencies at different points extending along a line transverse to said first line, means for detecting the combined effect of the two transformed signals upon said beam of light, and means for integrating the detected light pattern, whereby the location of maximum light along said first line is a measure of target range and the location of maximum light along said second line is a measure of the Doppler frequency of the echo signal.

2. A system as set forth in claim 1, wherein said two transforming and conducting means comprise a pair of bi-refractive, transparent, sonic delay line panels, each having an electrode-sonic transducer along one edge, and a sonic energy absorber along the opposite edge, said detecting means comprises crossed light polarizer plates sandwiching each delay line panel, and said integrating means comprises a photoconductive plate.

3. A system for processing information by the comparison of two electrical signals having substantially similar waveforms which are time displaced and differ somewhat in frequency, comprising means for transforming the first of said two signals into a form capable of affecting a beam of light in accordance with the waveform of said first signal, means for transforming the second of said two signals into a form capable of affecting a beam of light in accordance with the waveform of said second signal, means for conducting said transformed signals past each other along a first line, means for directing a modulated beam of light serially through said last-mentioned means, the modulation of said beam of light being an intensity modulation pattern spanning a band of intensity modulation frequencies corresponding to expected difference frequencies between said two signals, said pattern of frequencies providing a number of different frequencies at different points extending along a line transverse to said first line, means for detecting the combined effect of the two transformed signals upon said beam of light, and means for integrating the detected light pattern of said beam, whereby the location of maximum light along said first line is a measure of the time displacement between said two signals and the location of maximum light along said second line is a measure of the difference frequency between said two signals.

4. A system for processing information by the comparison of two electrical signals, comprising means for transforming each of the two signals into a form capable of affecting a beam of light in accordance with the waveform of the respective signal, means for conducting said transformed signals past each other along a first line, means for directing a modulated beam of light serially through both said transformed signals, the modulation of said beam of light being a pattern of different intensity modulations at different points along a second line and being related to a parameter of information being processed, means for detecting the combined effect of the two transformed sginals upon said beam of light, and means for integrating the detected light pattern of said beam, whereby the patterns of detected light along said first and second lines are respectively measures of two parameters of information.

5. A system as set forth in claim 4, wherein the differences in intensity modulation are differences in frequencies.

6. A system for processing information by the comparison of two signals comprising, means for transforming each of said signals into a form capable of affecting a beam of light in accordance with the waveform of the respective signal, means for producing a beam of light modulated differently at different areas transversely of the beam, said different modulations being related to a parameter of information being processed, means for directing said modulated beam of light serially through both said transformed signals, and means for detecting the combined effect of the two transformed signals upon said modulated beam of light.

7. A system for processing information as set forth in claim 6, wherein said different modulations are different frequencies of intensity modulation.

8. A system for processing information comprising, means for producing the information in a form capable of modulating a beam of light in accordance with a parameter of intelligence contained therein, means for producing a beam of light modulated differently at different areas transversely of the beam, said different modulations being related to said parameter of intelligence, means for directing said beam of light upon said information producing means to further modulate said beam of light with said intelligence, and means for detecting the effect of said further modulation on said beam of light.

9. A system for processing information as set forth in claim 8, wherein said different modulations at different areas of said light beam are different frequencies of intensity modulation.

10. A system for processing information comprising means for presenting the information in a form capable of modulating a beam of energy in accordance with a parameter of intelligence contained therein, means for directing a beam of said energy upon the first means to modulate said beam of energy with said intelligence, means for modulating said beam of energy differently at different areas transversely of the beam, said different modulations being related to said parameter of intelligence, and means for detecting the combined effect of the first and third mentioned means on said beam of energy.

11. A system as set forth in claim 10, wherein said different modulations at different areas of said beam are different frequencies of intensity modulation.

12. A system for processing information by the comparison of two signals comprising means for transforming each of said signals into a form capable of affecting a beam of energy in accordance with the waveform of the respective signal, means for directing a beam of said energy upon the first means for modulating the energy in accordance with the two signals, means for modulating the beam of energy differently at different areas transversely of the beam, and means for detecting the combined effect of the first and third mentioned means upon said beam of energy.

13. A system for processing information as set forth in claim 12, wherein said different modulations are different frequencies of intensity modulation.

References Cited

UNITED STATES PATENTS

| 2,418,964 | 4/1947 | Arenberg | 343—13 |
| 2,664,243 | 12/1953 | Hurvitz | 343—100.7 |
| 3,101,469 | 8/1963 | Varian | 343—9 |
| 3,205,495 | 9/1965 | Wilmotte | 343—13 X |

RODNEY D. BENNETT JR., Primary Examiner

T. H. TUBBESING, Assistant Examiner

U.S. Cl. X.R.

343—8, 13, 17.1